(12) United States Patent
Shinohara et al.

(10) Patent No.: US 8,787,055 B2
(45) Date of Patent: Jul. 22, 2014

(54) INVERTER DEVICE

(71) Applicant: Kabushiki Kaisha Toshiba, Tokyo (JP)

(72) Inventors: Naoto Shinohara, Yokohama (JP); Kazunobu Nagai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/795,181

(22) Filed: Mar. 12, 2013

(65) Prior Publication Data

US 2013/0314965 A1 Nov. 28, 2013

(30) Foreign Application Priority Data

May 25, 2012 (JP) ................................. 2012-119741

(51) Int. Cl.
*H02M 7/5387* (2007.01)
(52) U.S. Cl.
USPC ............................... 363/132; 363/40; 363/41
(58) Field of Classification Search
USPC ............. 363/40, 41, 55, 56.01, 56.02, 95, 98, 363/131, 132
See application file for complete search history.

(56) References Cited

U.S. PATENT DOCUMENTS

| 5,574,636 | A | 11/1996 | Lee et al. |
| 2010/0171473 | A1 | 7/2010 | Kazama |
| 2011/0299311 | A1* | 12/2011 | Zhu et al. ..................... 363/132 |

FOREIGN PATENT DOCUMENTS

| JP | 05-111263 | 4/1993 |
| JP | 5-111263 | 4/1993 |
| JP | 2009-273336 A | 11/2009 |

OTHER PUBLICATIONS

Office Action issued Jan. 31, 2014, in German Patent Application No. 10 2013 209 557.0 (with English-language Translation).

* cited by examiner

*Primary Examiner* — Nguyen Tran
(74) *Attorney, Agent, or Firm* — Oblon, Spivak, McClelland, Maier & Neustadt, L.L.P.

(57) ABSTRACT

An inverter device includes a DC positive input line and a DC negative input line, a main bridge which includes a pair of series-connected switching elements with diodes being connected in reverse parallel with the switching elements respectively, an auxiliary bridge which includes a pair of series-connected switching elements with diodes being connected in reverse parallel with the switching elements respectively and a current-limiting reactor. A plurality of sets each one of which includes the main bridge and the auxiliary bridge is connected between the DC positive and negative input lines. Each set constitutes a phase. The current-limiting reactor is connected between a common connection point of both switching elements of the main bridge and a common connection point of both switching elements of the auxiliary bridge in each set.

4 Claims, 3 Drawing Sheets

INVERTER DEVICE

CROSS-REFERENCE TO RELATED APPLICATIONS

This application is based upon and claims the benefit of priority from the prior Japanese Patent Application No. 2012-119741 filed on May 25, 2012, the entire contents of both of which are incorporated herein by reference.

FIELD

Embodiments described herein relate to an inverter device including switching elements composed into a bridge-connected configuration.

BACKGROUND

An inverter device such as a three-phase voltage-source inverter includes single-phase bridges constituting three phases. Each single phase includes a pair of series-connected switching elements (one is referred to as a positive switching element and the other as a negative switching element). The switching elements of each bridge are on-off controlled by PWM control so that DC power is converted to AC power. In this case, a switching pattern is determined so that dead time is interposed between OFF periods of the paired switching elements in order that both switching elements in each bridge may be prevented from being simultaneously turned on. Accordingly, the DC power source can be prevented from being short-circuited via each bridge.

However, another short-circuit current needs to be prevented as well as the above-described short-circuit current. More specifically, short-circuit current passing through a freewheeling diode needs to be overcome. Each pair of switching elements constituting an inverter is generally provided with a freewheeling diode connected in reverse parallel with each pair. For example, consider the case where the positive switching element is turned on under the condition that both positive and negative switching elements are turned off during dead time. It is known that in this case, current having passed through the switching element turned on becomes short-circuit current passing through the freewheeling diode of the negative switching element in the reverse direction. It is also known that the short-circuit current results from recovery current due to residual carriers remaining in the freewheeling diode.

The recovery current has a sharp needle-shaped waveform to result in large surge voltage which induces intense noise, fluctuates a body chassis potential of a vehicle, enlarges control errors and increases switching loss. The recovery current thus results in various failures. In view of these failures, a technique has conventionally been proposed to reduce recovery current in a three-phase voltage-source inverter. In the proposed technique, current-limiting reactors are interposed in series to the switching elements respectively. Freewheeling diodes are connected in parallel to the series circuits of the current-limiting reactors and the switching elements respectively. The proposed configuration requires no treatment of switching control software. However, steady current normally passes through the current-limiting reactors in the proposed configuration. This results in disadvantage in inverter's use application in which loss should be avoided.

DETAILED DESCRIPTION

In general, according to one embodiment, an inverter device comprises a DC positive input line and a DC negative input line, a main bridge, an auxiliary bridge, a current-limiting reactor and a control. The main bridge includes a pair of series-connected switching elements provided with diodes connected in reverse parallel with the switching elements respectively. The auxiliary bridge includes a pair of series-connected switching elements provided with diodes connected in reverse parallel with the switching elements respectively. A plurality of sets each one of which includes the main bridge and the auxiliary bridge is connected between the DC positive and negative input lines, each set constituting a phase. The current-limiting reactor is connected between a common connection point of both switching elements of the main bridge and a common connection point of both switching elements of the auxiliary bridge in each set. The control is configured to PWM-control an on-off operation of each switching element constituting the main bridge. The current-limiting reactor has inductance with a time constant set at a value such that the time constant is not more than an on/off period of the switching elements of the main bridge.

Figure 1:
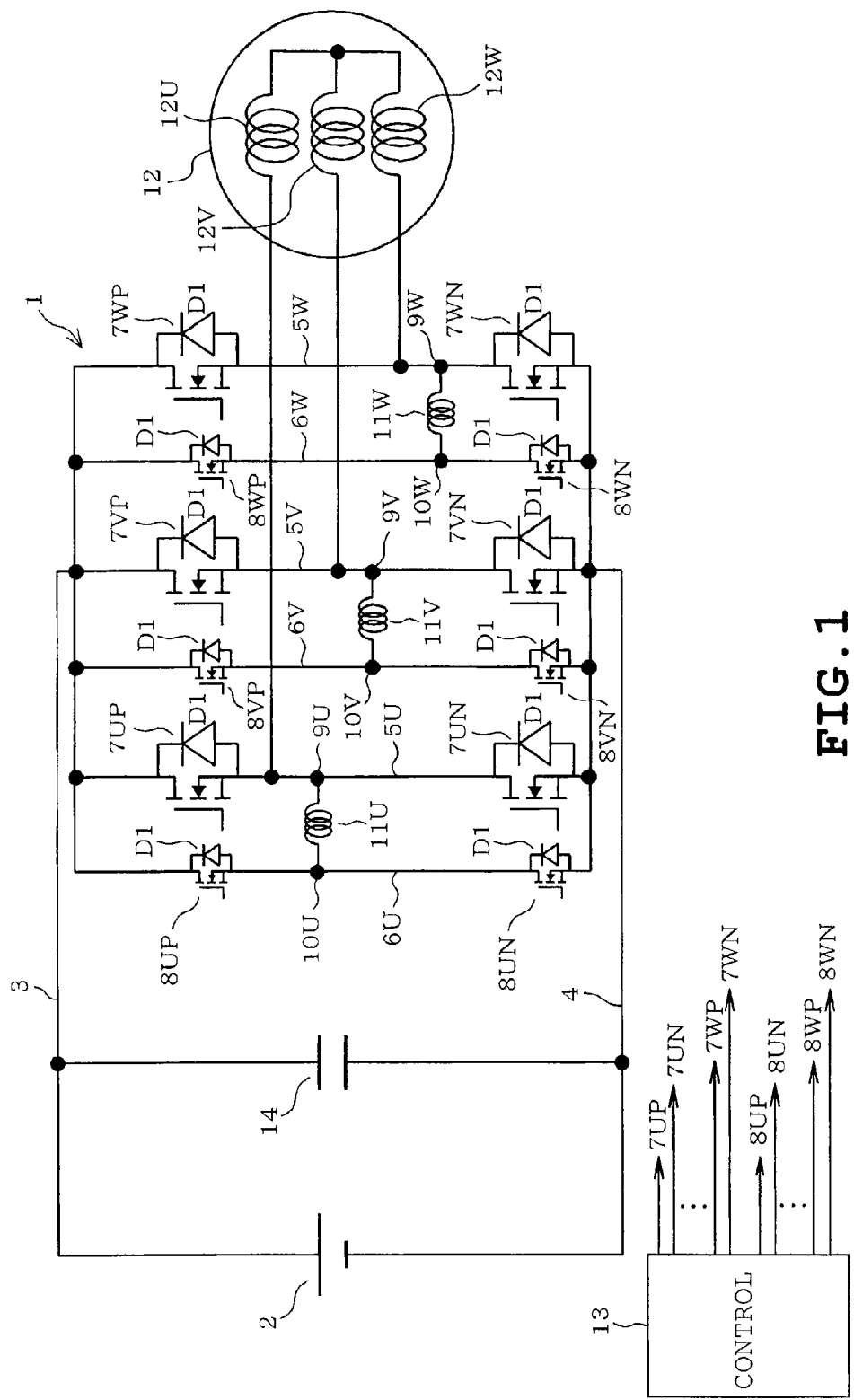
FIG. 1 is a circuit diagram of an inverter device according to an embodiment.

Embodiments will be described with reference to the accompanying drawings. Referring to FIG. 1, an inverter circuit 1 according to one embodiment is shown. The inverter circuit 1 is configured to receive DC power from a positive DC input line 3 and a negative DC input line 4 both connected to a DC power supply such as a battery or a DC-DC converter, converting the received DC power to AC power. The inverter circuit 1 includes main bridges 5U, 5V and 5W constituting a plurality of, for example, three phases U, V and W. The inverter circuit 1 also includes auxiliary bridges 6U, 6V and 6W paired with the main bridges 5U, 5V and 5W respectively. These bridges 5U to 6W are connected between the positive and negative DC input lines 3 and 4. The U-phase main bridge 5U includes two switching elements 7UP and 7UN connected in series to each other. The main bridge 5V also includes two switching elements 7VP and 7VN connected in series to each other. The main bridge 5W also includes two switching elements 7WP and 7WN. The auxiliary bridge 6U includes two switching elements 8UP and 8UN. The auxiliary bridge 6V also includes two switching elements 8VP and 8VN. The auxiliary bridge 6W also includes two switching elements 8WP and 8WN.

A current-limiting reactor 11U is connected between a common connection point 9U of both switching elements 7UP and 7UN of the U-phase main bridge 5U and a common connection point 10U of both switching elements 8UP and 8UN of the U-phase auxiliary bridge 6U. Current-limiting reactors 11V and 11W are also connected between common connection points 9V and 10V and common connection points 9W and 10W respectively. The common connection points 9O, 9V 9W of the main bridges 5U, 5V and 5W also serve as output terminals of the inverter circuit 1. A rotating electrical machine such as a brushless motor 12 serving as a load includes stator windings 12U, 12V and 12W which are connected to the common connection points 9U, 9V and 9W. The six switching elements 7UP to 7WN constituting the main bridges comprise semiconductor switching elements such as FETs respectively. The six switching elements 8UP to 8WN constituting the auxiliary bridges also comprise semiconductor switching elements such as FETs respectively. The switching elements 7UP to 8WN are provided with freewheeling diodes D1 connected in reverse parallel to the switching elements 7UP to 8WN respectively. The freewheeling diodes D1 may be capacity components parasitic to FETs, instead.

The inverter device includes a control 13 supplying switching control signals on-off controlling the switching elements 7UP to 7WN and 8UP to 8WN. The control signals are PWM signals as well known in the field of the inverter device. Reference numeral 14 in FIG. 1 designates a smoothing capacitor.

Figure 2:
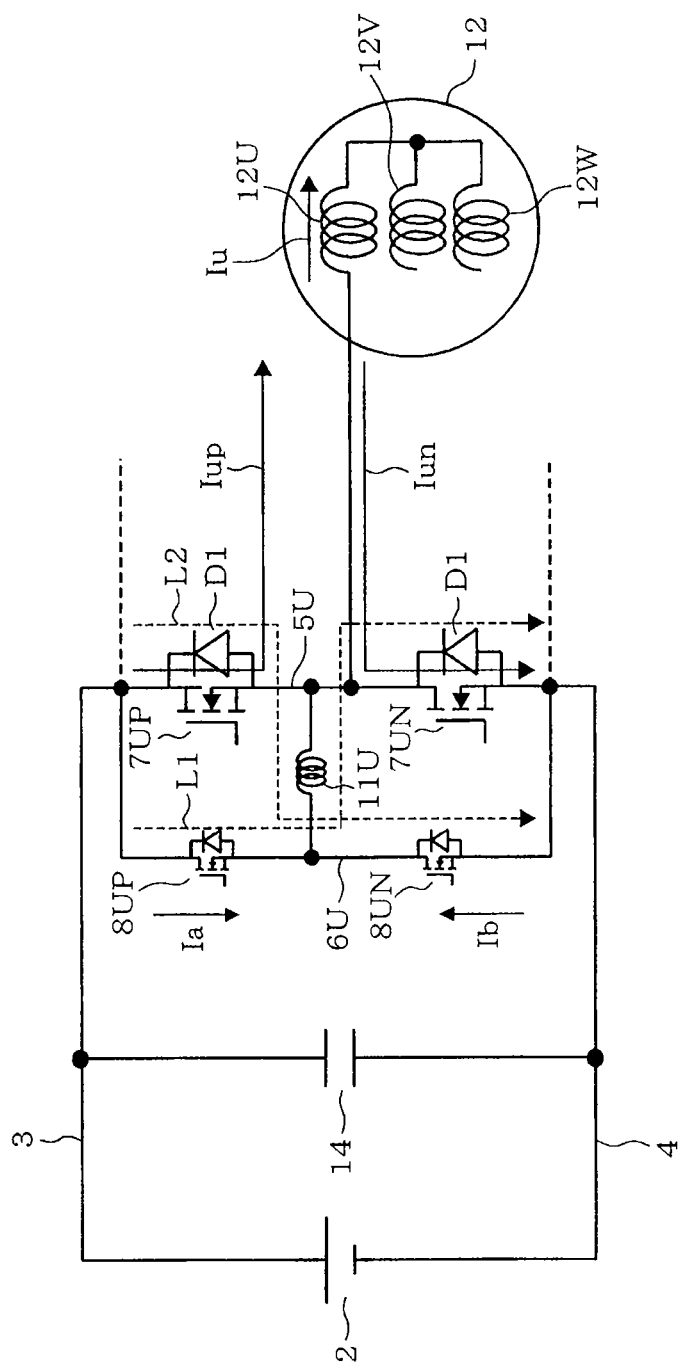
FIG. 2 is a circuit diagram showing apart of the electrical circuit as shown in FIG. 1.
Figure 3:
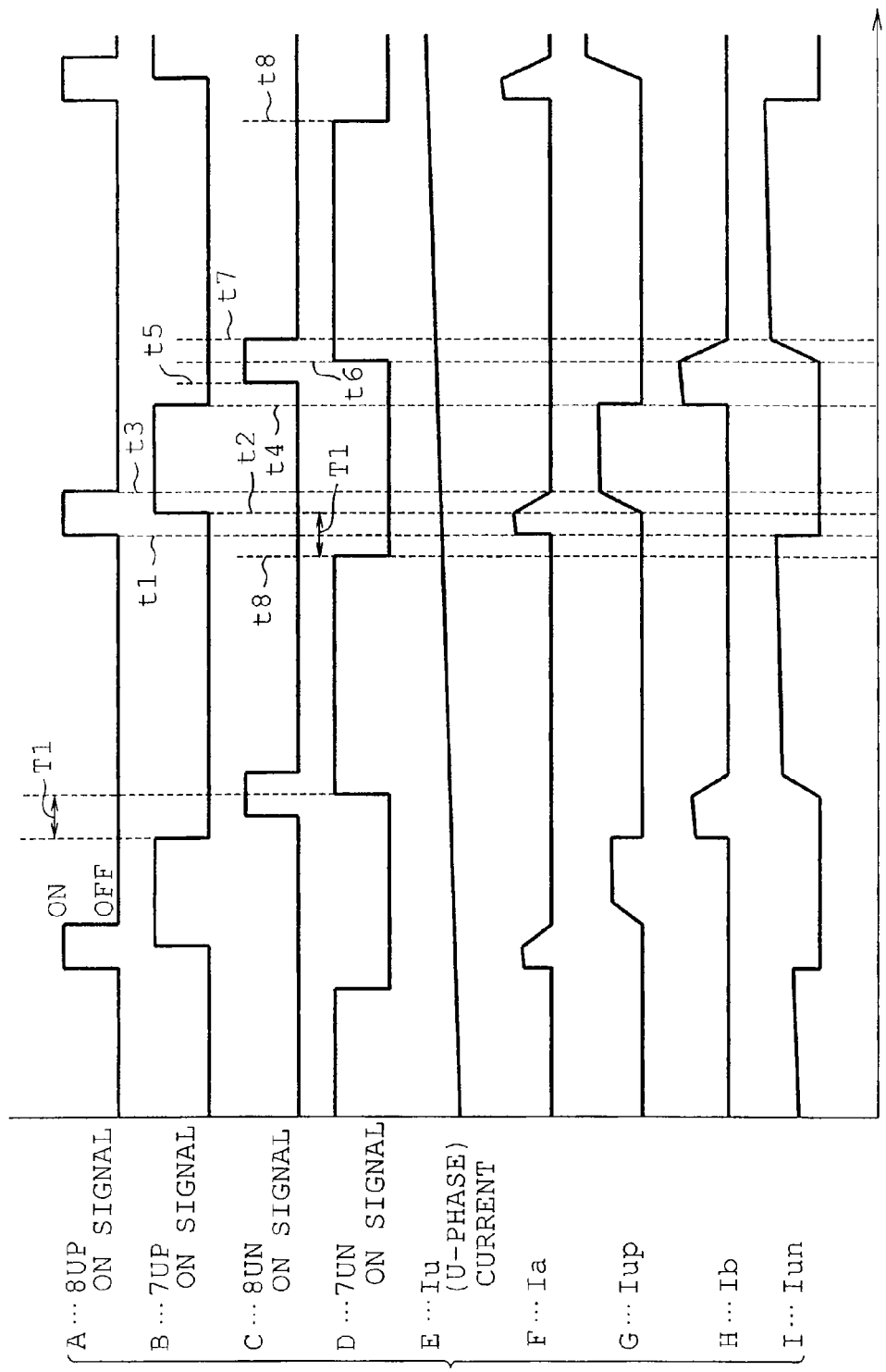
FIG. 3 is a schematic graph showing signal waveforms and current waveforms for explanation of the operation of the circuit in FIG. 1.

The working of the inverter device thus configured will be described in detail as follows with reference to FIGS. 2 and 3 as well as to FIG. 1. An on/off pattern of the switching elements 7UP to 7WN is the same as that of an average inverter circuit which converts DC power to three-phase sinusoidal AC by a PWM control. Describing this with respect to the U-phase with reference to FIG. 3, on/off patterns of the switching elements 7UP and 7UN of the U-phase main bridge 6U are as shown in FIGS. 3-B and 3-D. Reference symbol "T1" designates dead time.

ON timing of the switching elements of each auxiliary bridge is set so as to take place a predetermined time ahead of ON timing of the switching elements of each main bridge corresponding to the auxiliary bridge. OFF timing of the switching elements of each auxiliary bridge is also set so as to take place a predetermined time ahead of OFF timing of the switching elements of each main bridge corresponding to the auxiliary bridge. The following describes this with reference to FIG. 3. Parts A and B of FIG. 3 (hereinafter, "FIG. 3-A" and "FIG. 3-B") show the relationship between the positive switching element 7UP of the main bridge 5U and the positive switching element 8UP of the auxiliary bridge 6U. In the relationship, when element 7UP of the main bridge is to be turned on, the element 8UP of the auxiliary bridge is turned on at time t1 ahead of turn-on of the element 7UP. Furthermore, as understood from the comparison between FIGS. 3-A and 3-B, an OFF operation of the element 8UP of the auxiliary bridge precedes an OFF operation of the element 7UP of the main bridge (time t3).

The above-described timing relationship is also applied to the set of the negative switching element 7UN of the U-phase main bridge 5U and the negative switching element 8UN of the auxiliary bridge 6U as shown in FIGS. 3-C and 3-D. FIG. 2 shows current pathways based on the above-described ON/OFF patterns, and FIG. 3 shows the ON/OF timing and current patterns. Current flow will be described with attention to the following switching patterns (1) and (2) of the main bridge serving as a subject in the DC-AC conversion, for example, the U-phase main bridge 5U.

Regarding switching pattern (1), in the state where both switching elements 7UP and 7UN of the main bridge 5U are off during dead time T1, the positive switching element 7UP is turned on (time t2) and is then turned off (time t4). Regarding switching pattern (2), in the state where both switching elements 7UP and 7UN of the main bridge 5U are off during dead time T1, the negative switching element 7UN is turned on (time t6) and is then turned off (time t8).

In pattern (1), the positive switching element 8UP of the auxiliary bridge 6U is firstly turned on at preceding time t1. Current Ia then passes through the element 8UP and the current-limiting reactor 11U as shown by a current pathway L1 in FIG. 2. The current Ia reversely passes through the freewheeling diode D1 connected in reverse parallel with the negative switching element 7UN that is in the OFF state, flowing into the negative DC input line 4. Thus, the current passes through the freewheeling diode D1 in the reverse direction. This is caused by residual carriers due to electrical energy preserved in a stator winding in the previous switching cycle. The electrical energy passes, as return current, through the diode D1 in the forward direction, producing residual carriers. The current is referred to as "recovery current."

Steep rise of the recovery current is rendered more gradual by the current-limiting reactor 11U, whereupon the recovery current is prevented from becoming short-circuit current. Subsequently, the positive switching element 7UP of the main bridge 5U is turned on at time t2, so that the control proceeds to the normal PWM switching control cycle by the main bridge 5U. The switching element 8UP which has precedently been turned on is turned off immediately after turn-on of the switching element 7UP (time t3). The switching element 7UP is turned off upon lapse of ON duty (time t4).

In pattern (2) following the above-described pattern (1), the negative switching element 8UN of the auxiliary bridge 6U is turned on at time t5 preceding turn-on of the negative switching element 7UN of the main bridge 5U. Current Ib then reversely passes through the freewheeling diode D1 connected in reverse parallel with the positive switching element 7UP that is in the OFF state, as shown by a current pathway L2 in FIG. 2. The current Ib further passes through the current-limiting reactor 11U and the switching element 8UN which has precedently been turned on, flowing into the negative input line 4.

In the above-described case, too, the current ib flowing through the freewheeling diode D1 in the reverse direction is a recovery current resulting from the return current forward returning from the stator winding across the freewheeling diode D1 connected in reverse parallel with the positive switching element 7UP which is in the OFF state. In this case, too, an increase in the recovery current is suppressed by the current-limiting reactor 11U. Subsequently, the negative switching element 7UN of the main bridge 5U is turned on at time t6. This starts the normal PWM switching control cycle by the main bridge 5U. The switching element 8UN of the auxiliary bridge 6U turned on ahead is turned off immediately after turn-on of the switching element 7UN (time t7).

As described above, electrical energy is preserved in the current-limiting reactor 11U as the result of the passing of the recovery current therethrough when the switching element 8UP or 8UN of the auxiliary bridge 6U is turned off. The electrical energy thus stored in the current-limiting reactor 11U is used as electrical power in the stator winding at the time a closed loop is formed which passes through either on-state one of the switching elements 7UP and 7UN of the main bridge 5U, either on-state one of the switching elements 8UP and 8UN of the auxiliary bridge 6U, the freewheeling diodes D1 corresponding to the respective on-state switching elements and one of the stator windings 12U-12W. In FIGS. 2 and 3, reference symbol Iu designates a stator winding current, reference symbol IUP designates current passing through the switching element 7UP and reference symbol IUN designates current passing through the switching element 7UN.

In the foregoing embodiment, it is desirable for high-speed PWM control that an ON period of the switching element of each auxiliary bridge be rendered as short as possible in the configuration that the ON/OFF timing of the auxiliary bridge precedes the ON/OFF timing of the main bridge. As means for accomplishing this, a time constant of each current-limiting reactor nay suitably be set so that an ON period of the switching element of each auxiliary bridge is rendered shorter than the ON/OFF period of the switching element of each main bridge by the PWM control. Alternatively, for the purpose of further shortening, an OFF time of the switching element of each auxiliary bridge may be set so as to take place immediately after an ON time of the switching element of each main bridge.

According to the above-described embodiment, there can be provided the inverter device which can effectively suppress the recovery current resulting in various failures. Furthermore, the inverter device can prevent complication of the control since the ON/OFF timing of each auxiliary bridge is caused to precede the ON/OFF timing of each main bridge. Still furthermore, the inverter device can effectively use as electrical power the electrical energy preserved in suppression of recovery current in each current-limiting reactor.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An inverter device comprising:
   a DC positive input line and a DC negative input line;
   a main bridge which includes a pair of series-connected switching elements provided with diodes connected in reverse parallel with the switching elements respectively;
   an auxiliary bridge which includes a pair of series-connected switching elements provided with diodes connected in reverse parallel with the switching elements respectively;
   a current-limiting reactor; and
   a control configured to PWM-control an on-off operation of each switching element constituting the main bridge,
   wherein a plurality of sets each one of which includes the main bridge and the auxiliary bridge is connected between the DC positive and negative input lines, said each set constituting a phase;
   the current-limiting reactor is connected between a common connection point of both switching elements of the main bridge and a common connection point of both switching elements of the auxiliary bridge in each set; and
   the current-limiting reactor has inductance with a time constant set at a value such that the time constant is not more than an on/off period of the switching elements of the main bridge.

2. The inverter according to claim 1, wherein the pair of switching elements comprising positive and negative switching elements, and the control is configured to start an ON operation of each of the positive and negative switching elements of the auxiliary bridge ahead of an ON operation of each of the positive and negative switching elements of the main bridge.

3. The inverter according to claim 1, wherein the pair of switching elements comprising positive and negative switching elements, and the control is configured to start an OFF operation of each of the positive and negative switching elements of the auxiliary bridge immediately after an ON operation of each of the positive and negative switching elements of the main bridge.

4. The inverter according to claim 2, wherein the control is configured to start an OFF operation of each of the positive and negative switching elements of the auxiliary bridge immediately after an ON operation of each of the positive and negative switching elements of the main bridge.

* * * * *